United States Patent [19]

Twardowski et al.

[11] Patent Number: 4,683,039
[45] Date of Patent: Jul. 28, 1987

[54] MEMBRANE PERVAPORATION PROCESS

[75] Inventors: Zbigniew Twardowski, Mississauga; James D. McGilvery, Etobicoke, both of Canada

[73] Assignee: Tenneco Canada Inc. (ERCO division), Islington, Canada

[21] Appl. No.: 813,078

[22] Filed: Dec. 24, 1985

[51] Int. Cl.$^4$ .............................. C25B 1/26; C02F 1/44
[52] U.S. Cl. ..................................... 204/95; 210/640; 210/638
[58] Field of Search ..................... 204/95, 94; 210/649, 210/651, 640, 638, 644, 180, 321.1–321.2; 55/158

[56] References Cited

U.S. PATENT DOCUMENTS 3,763,006 10/1973 Callerame ............................ 204/95
4,476,024 10/1984 Cheng ................................ 210/640

Primary Examiner—John F. Niebling
Assistant Examiner—Ben Hsing
Attorney, Agent, or Firm—Sim & McBurney

[57] ABSTRACT

Chlorine dioxide is transferred by membrane pervaporation from one chamber filled with aqueous chlorine dioxide-generating reactants or other chlorine dioxide donor medium across a gas-permeable hydrophobic membrane to a recipient aqueous medium filling a second chamber. The recipient medium may be water, pulp suspension or sodium chlorite solution. The membrane typically is expanded polytetrafluoroethylene.

15 Claims, 3 Drawing Figures

MEMBRANE PERVAPORATION PROCESS

FIELD OF INVENTION

The present invention relates to a novel pervaporation process for the membrane transfer of chlorine dioxide between aqueous media.

BACKGROUND TO THE INVENTION

Chlorine dioxide is used for bleaching a variety of materials, including wood pulps. Chlorine dioxide conveniently is formed by reduction of sodium chlorate in an acid aqueous reaction medium and the chlorine dioxide is evolved as a gas. The gas then is absorbed in water using absorption towers to form an aqueous solution for use.

Chlorine dioxide undergoes spontaneously decomposition when present at high partial pressures in the gas phase and steps are taken, during the production of chlorine dioxide, to dilute the gas phase to inhibit such decomposition. However, localized high partial pressures of chlorine dioxide inevitably occur in the gas space of commercial chlorine dioxide generators, leading to the formation of what are termed "puffs", or localized decompositions of chlorine dioxide, which is undesirable since such puffs result in a decreased yield of chlorine dioxide.

SUMMARY OF INVENTION

In accordance with one embodiment of the present invention, thee is provided a method of formation of chlorine dioxide in a reaction zone having a hydrophobic gas-permeable membrane separating the reaction zone into two separate chambers. Chlorine dioxide is generated from aqueous reactants filling one chamber and passes through the membrane by pervaporation to an aqueous medium filling the other chamber to be dissolved therein.

In this method, the chlorine dioxide generated from aqueous chlorine dioxide-producing reactants is transferred rapidly across the membrane by membrane pervaporation to the recipient aqueous medium while the hydrophobic nature of the membrane prevents both the aqueous reaction medium and the aqueous recipient medium from passing through the membrane.

By proceeding in this manner, the incidence of chlorine dioxide puffing is eliminated while the necessity for an absorption tower also is elimintaed, thereby enabling much simplified equipment to be used for chlorine dioxide generation.

In many chlorine dioxide-generating processes, chlorine is co-produced with the chlorine dioxide, and that gas also passes through the membrane to be dissolved in the recipient aqueous medium.

The present invention has particular application to the generation of chlorine dioxide and the dissolution of such generated chlorine dioxide in the recipient aqueous medium. However, the present invention is broadly applicable to the transfer of chlorine dioxide from a donor medium containing the same in a first chamber to a recipient aqueous medium receiving the same in a second chamber. The donor medium may comprise chlorine dioxide in any convenient form, including gaseous chlorine dioxide with or without other gases, such as chlorine, and an aqueous solution of chlorine dioxide, which may also have co-dissolved chlorine.

GENERAL DESCRIPTION OF INVENTION

Figure 1:
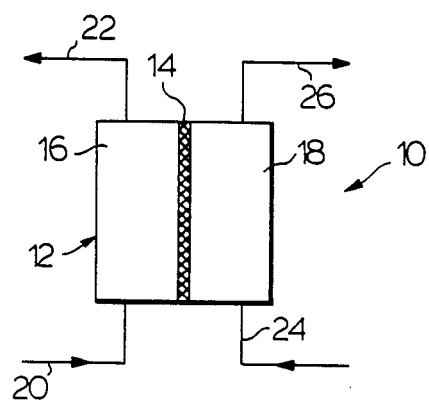
FIG. 1 is a schematic representation of one embodiment of the process of this invention.

Any convenient material of construction may be used for the membrane provided that the membrane is sufficiently porous to permit the flow of gases therethrough and sufficiently hydrophobic to prevent the passage of aqueous solution therethrough. One suitable material of construction is expanded polytetrafluoroethylene sheet, which is commercially-available under the trade mark "GORE-TEX". The procedure for formation of such expanded polytetrafluoroethylene is described in U.S. Pat. No. 3,953,566.

The membrane may be provided as a composite with supporting materials to provide the structural strength required for use herein. Such supporting materials include a variety of polymeric materials, including polyvinyl chloride and polyethylene, and other materials, such as fibreglass scrims, felts and webs.

The pore sizes in the membrane may vary widely, depending on the desired flow rate of the chlorine dioxide through the membrane. The pores should not be so small as to prevent chlorine dioxide gas flow therethrough but also should not be so large that liquid flow is permitted. Usually, the membrane pore size varies from about 0.02 to about 15 microns, preferably from about 0.02 to about 5 microns.

The porosity of the membrane may vary widely, also depending upon the desired flow rate of chlorine dioxide through the membrane. Considerations of membrane strength also dictate the porosity chosen. Generally, the membrane porosity varies from about 50 to about 98%.

The thickness of the membrane is dictated by strength considerations rather than by any requirement based on process requirements. Generally, the supported membrane thickness varies from about 0.1 to about 2 mms.

It is not essential to the present invention that the membrane be constructed of hydrophobic material throughout its thickness, provided that the surfaces of the membrane contacting the aqueous media are hydrophobic and thereby prevent the flow of the aqueous media through the membrane.

The membrane may be provided in any desired geometric shape, generally planar form or in tubular form, as desired, to separate the transfer zone into the two chambers.

In one embodiment of the present invention, the first chamber is filled with an aqueous acid chlorine dioxide-generating medium. This reaction medium generally may be considered as one form of a donor medium comprising chlorine dioxide, specifically one form of an aqueous solution of chlorine dioxide from which the chlorine dioxide is transferred across the membrane.

A wide variety of chlorine dioxide-generating processes may be employed in the present invention. One class of such processes is based on sodium chlorate, which is reacted with a reducing agent in the presence of a strong mineral acid, such as sulphuric acid, hydrochloric acid and phosphoric acid. Another class of such processes is based on sodium chlorite, which is reacted with oxidizing agent and/or a strong mineral acid. Combinations of sodium chlorate and sodium chlorite also may be employed.

Specific examples of combinations of reactants which may be employed are (a) sodium chlorate, sodium chloride and and sulphuric acid, (b) sodium chlorate and hydrochloric acid, (c) sodium chlorate, sodium chlorite, sodium chloride and sulphuric acid, (d) sodium chlorate, sodium chlorite and hydrochloric acid, (e) sodium chlorate, sulphur dioxide and sulphuric acid, (f) sodium chlorate, methanol and sulphuric acid, (g) sodium chlorite and chlorine, (h) sodium chlorite and hydrochloric acid and/or sulphuric acid, (i) sodium chlorite, oxidizing gas and sulphuric acid, (j) sodium chlorate, sodium chloride, hydrogen perioxide and/or methanol and sulphuric acid, (k) sodium chlorite, sodium hypochlorite and hydrochloric acid and/or sulphuric acid, and (l) sodium chlorate, glucose and sulphuric acid. Other suitable combinations of reactants also may be employed.

Usually, the process of the present invention is carried out continuously, with chlorine dioxide-generating reactants being fed to one compartment and the chlorine-dioxide recipient aqueous solution being fed to the other compartment. However, a batch operation may be effected, if desired.

The donor medium located in the one chamber may take the form of any source of chlorine dioxide and in another embodiment of the invention may comprise an aqueous chlorine dioxide solution obtained as the aqueous effluent from an absorption tower of a conventional chlorine dioxide generating operation, for example, any of those generally known by the designations R2, R3, R5, R6, R7 or R8.

This embodiment of the invention is particularly useful where the chlorine dioxide present in the solution is required to be dissolved in another aqueous medium. Using the present invention, pervaporation of the chlorine dioxide from the donor aqueous medium to the recipient aqueous medium is effected across the membrane, rather than having to strip out the chlorine dioxide from the donor aqueous medium and then redissolve the stripped chlorine dioxide in the recipient aqueous medium, which otherwise would be the case.

The chlorine dioxide present in one compartment and flowing through the hydrophobic gas permeable membrane may be dissolved in any aqueous medium in the other compartment. In one embodiment, the chlorine dioxide is dissolved in water to form an aqueous solution of the chlorine dioxide. In another embodiment, the aqueous medium may be wood pulp slurry, so that the chlorine dioxide bleaches the wood pulp. In a further embodiment, the recipient aqueous medium is waste water and the dissolution of the chlorine dioxide causes disinfection.

The prevaporation transfer of chlorine dioxide from one aqueous solution to another may be employed to form the aqueous solution of chlorine dioxide used as feed to an electrolytic process for formation of sodium chlorite. It is known to produce sodium chlorite electrolytically by feeding an aqueous solution of chlorine dioxide to the cathode compartment and an aqueous solution of sodium hydroxide to the anode compartment of a divided cell. The process is described in U.K. Pat. No. 2,002,033.

The process of the present invention may be employed to provide the catholyte for this electrolytic process of forming sodium chlorite. In one procedure, chlorine dioxide-depleted catholyte is circulated to the chlorine dioxide generator to dissolve chlorine dioxide flowing across the membrane, before being returned to the cathode compartment.

In another procedure, chlorine dioxide-depleted catholyte is circulated to one compartment of a pervaporation transfer vessel while an aqueous chlorine dioxide solution is fed to the other compartment. Chlorine dioide flows across the membrane and is dissolved in the catholyte, before the chlorine dioxide-enriched catholyte is retured to the cathode compartment. The donor aqueous chlorine dioxide solution may be an aqueous chlorine dioxide solution obtained from an absorption tower of a conventional chlorine dioxide generating process or may be an aqueous chlorine dioxide solution formed using the process of the present invention.

The latter procedure is particularly useful when the chlorine dioxide-generating process co-produces chlorine. Such coproduced chlorine also usually flows across the membrane to be dissolved in the recipient aqueous medium. The presence of dissolved chlorine in the catholyte feed to the sodium chlorite-producing electrolytic process decreases the current efficiency and introduces more impurities into the electrolysis process and hence is not desired.

In accordance with one preferred embodiment of the invention, the recipient aqueous medium for the generated chlorine dioxide is acidified so as to inhibit dissolution of the co-produced chlorine. The chlorine dioxide solution which results then may be forwarded to a second transfer zone wherein the preferentially-dissolved chlorine dioxide then can be transferred by pervaporation to the chlorine dioxide-depleted catholyte. Since the catholyte is required to be alkaline, the two-stage transfer of chlorine dioxide from the chlorine dioxide-generating reactants to the catholyte is adopted.

DESCRIPTION OF PREFERRED EMBODIMENTS

Referring to FIG. 1, a chlorine dioxide generator 10 comprises a reaction vessel 12 having a gas-permeable hydrophobic membrane 14 separating the internal volume into two compartments or chambers 16 and 18. Chlorine dioxide-generating reactants are fed by line 20 to the compartment 16 for generation of chlorine dioxide in the compartment 16.

As noted earlier, a variety of combinations of reactants may be used to generate chlorine dioxide. Usually, the acidic reactant is fed to the generator 10 separately from the other reactants. The compartment 16 may be provided with heating means, if desired, so as to effect the chlorine dioxide generation at an elevated temperature. Spent generation chemicals leave the compartment 16 by line 22.

An aqueous medium for the dissolution of chlorine dioxide, usually water, is fed to the compartment 18 by line 24. Chlorine dioxide generated in the compartment 16 from the reactants fed by line 20 passes across the gas-permeable membrane 14 to the aqueous phase in the compartment 18 for dissolution therein. The hydrophobic nature of the membrane 14 prevents passage of the aqueous media therethrough. Aqueous chlorine dioxide solution is removed by line 26.

The chlorine dioxide-generating reactants are fed by line 20 at a flow rate sufficient to maintain the compartment 16 full of aqueous reactants while the aqueous medium is fed by line 24 at a flow rate sufficient to maintain the compartment 18 full of aqueous medium. In this way, no gas space is present in either compartment, so that there is no opportunity for chlorine dioxide puffing to occur.

Figure 2:
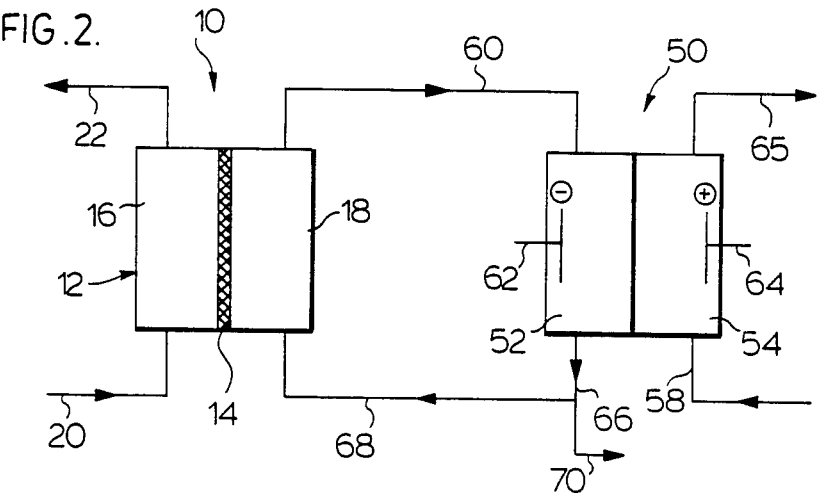
FIG. 2 is schematic representation of a second embodiment of the process of this invention.

Referring now to FIG. 2, there is illustrated therein the combination of the chlorine dioxide generator 10 of the present invention with an electrolytic process for forming sodium chlorite. An electrolytic cell 50 has a cathode compartment 52 separated from an anode compartment 54 by suitable cation-permeable membrane 56.

Sodium sulphate or other suitable source of sodium ions is fed tot he anode compartment 54 by line 58 while aqueous chlorine dioxide solution is fed to the cathode compartment 52 by line 60. Upon application of an electric current between electrodes 62, 64 respectively located in the cathode and anode compartments 52, 54 sodium ions migrate across the membrane 56 as the chlorine dioxide is electrolyzed to chlorite ions, and sodium chlorite thereby is formed. The depletion sodium ion feed is removed from the anode compartment by line 65.

The sodium chlorite solution is removed from the cathode compartment 52 and is recycled by lines 66, 68 to the compartment 18 of the chlorine dioxide generator 18 for dissolution of chlorine dioxide therein. The resulting solution exiting the compartment 18 then is recycled by line 60 to the cell 50 as the catholyte. A bleed off line 70 is provided for recovery of product sodium chlorite.

Figure 3:
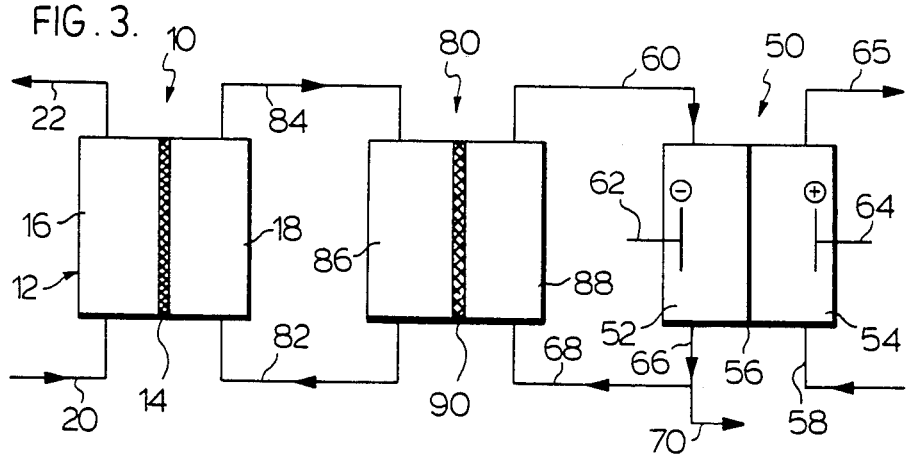
FIG. 3 is a schematic representation of a third embodiment of the process of this invention.

Referring to FIG. 3, there is illustrated the combination of the chlorine dioxide generator 10 of the present invention with the electrolytic cell 50 for forming sodium chlorite, along with an intermediate chlorine dioxide transfer vessel 80. This embodiment of FIG. 3 is particularly applicable to a process wherein the chlorine dioxide-generating process occurring in the chamber 16 coproduces chlorine.

The recipient aqueous medium which passes to the compartment 18 by line 82 is acidified to inhibit the dissolution of the chlorine therein but to permit the chlorine dioxide to be dissolved. The chlorine dioxide solution which results from the compartment 18 is passed by line 84 to one compartment 86 of the transfer vessel 80.

The chlorine dioxide-depleted sodium chlorite solution in line 68 is passed to the compartment 88 on the opposite side of the membrane 90 from the compartment 86. The membrane 90 is of the same type as membrane 14. Chlorine dioxide present in the solution in compartment 86 passes across the membrane 90 to be dissolved in the sodium chlorite solution, so as to form the catholyte feed in line 60 for the electrolytic cell 50.

The embodiment of FIG. 3 is advantageous for producing a catholyte feed for sodium chlorite production when the chlorine dioxide-generating process coproduces chlorine. Such chlorine is undesirable in the electrolytic production of sodium chlorite and the acidification of the recipient medium in line 82 inhibits dissolution of the chlorine. The selective dissolution of chlorine dioxide in chlorine dioxide-depleted sodium chlorite solution cannot be employed, since the latter medium is alkaline. It is necessary to utilize an intermediate transfer vessel 80 for the chlorine dioxide.

EXAMPLES

An experimental test apparatus was set up comprising two plates constructed of KYNAR (Trademark) material and two silicone rubber of EPDM gaskets forming compartment for donating and receiving solutions. The backplates were fitted with inlet and outlet ports and 1 mm thick nettings constructed of VEXAR (Trademark) material were placed into each compartment to support the membrane and to promote turbulent flow of the solution. Each Vexar piece had a volume of about 0.9 cm$^3$.

KYNAR is a trademark of Pennwalt Corporation for a polyvinylidene bifluoride polymer. The abbreviation EPDM refers to an ethylene-propyl-diene monomer rubber, the one employed being that designated 6962 and sold by Prince Rubber and Plastic Company. VEXAR is a trademark of DuPont for a polypropylene mesh.

A 1.0 μm membrane constructed of "GORE-TEX" material (i.e. expanded polytetrafluoroethylene) supported on PVC-coated fibreglass scrim was sandwiched between soft silicone rubber gaskets and had an exposed area of 32 m$^2$. The compartment volumes were both 5.6 cm$^3$ and 8.9 m$^3$ respectively for 2 and 3 mm gaskets. The size of the empty rectangular channels formed were 50×2 mm (thinner gasket) and 50×3 (thicker gasket).

A 1.1 litre solution of ClO$_2$ was circulated on one side of the membrane while the same volume of the receiving solution was circulated at the same rate on the opposite side. Samples of the receiving solution were withdrawn at regular intervals, usually 30 or 60 minutes, and analyzed for ClO$_2$ content.

The results obained in the experiments were expressed in terms of pervaporation coefficient K, which described ClO$_2$ flux normalized to the unitary concentration driving force. The expression K is calculated as follows:

$$K = \frac{\ln\left[1 - \frac{(1 + V_R/V_D)C_R}{C_D'}\right]}{-(A/V_R)(1 + V_R/V_D)t}$$

where
  $V_D$ = volume of donating solution (litres)
  $C_D'$ = initial ClO$_2$ concentration in donating solution (gpl)
  $V_R$ = volume of receiving solution (litres)
  $C_R'$ ClO$_2$ concentration in receiving solution (gpl)
  K = pervaporation constant (g ClO$_2$/cm$^2$ min.gpl)
  A = membrane area (cm$^2$)
  t = time (min).

EXAMPLE 1

In a first series of experiments, the transfer of ClO$_2$ as a function of linear solution rate and temperature was determined for an aqueous chlorine dioxide donating solution and H$_2$O as the receiving solution. The results are reproduced in the following Table 1:

TABLE I

| RUN NO. | GASKET SIZE, mm | TEMP.* [°C] | TOTAL TIME [min.] | LINEAR SOLN. VELOCITY [cm/sec] | GpL ClO$_2$ IN DONATING SOLUTION INITIAL | GpL ClO$_2$ IN DONATING SOLUTION FINAL | FINAL GPl CLO$_2$ IN RECEIVING SOLUTION | AVG. K × 10$^6$ g/cm$^2$ min. gpL |
|---|---|---|---|---|---|---|---|---|
| 1 | 2 | 25 | 240 | 2.8 | 9.2 | 6.0 | 2.4 | 53.9 |

TABLE I-continued

| RUN NO. | GASKET SIZE, mm | TEMP.* [°C] | TOTAL TIME [min.] | LINEAR SOLN. VELOCITY [cm/sec] | GpL ClO$_2$ IN DONATING SOLUTION INITIAL | GpL ClO$_2$ IN DONATING SOLUTION FINAL | FINAL GpL ClO$_2$ IN RECEIVING SOLUTION | AVG. K × 10$^6$ g/cm$^2$ min. gpL |
|---|---|---|---|---|---|---|---|---|
| 2 | 2 | 25 | 180 | 4.7 | 9.7 | 5.4 | 2.6 | 75.7 |
| 3 | 2 | 25 | 180 | 5.9 | 8.2 | 4.7 | 2.7 | 33.6 |
| 4 | 2 | 60 | 120 | 4.7 | 6.9 | 2.4 | 1.9 | 120 |
| 5 | 2 | 60 | 180 | 4.7 | 9.4 | 4.6 | 3.4 | 131 |
| 6 | 2 | 50 | 240 | 4.7 | 9.9 | 4.7 | 3.8 | 114 |
| 7 | 3 | 25 | 240 | 3.7 | 6.4 | 4.0 | 1.8 | 62.4 |
| 8 | 3 | 25 | 180 | 5.0** | 7.4 | 4.3 | 2.2 | 87.6 |
| 9 | 3 | 25 | 180 | 8.0** | 4.1 | — | 1.5 | 134 |

*Refers to the temp. of donating solution only.
**Additional Saran packing used, i.e. channel cross-section reduced by 0.5 cm$^2$ (est).

The variation in K values with variations in circulation rate and temperature may be seen from the results of this Table 1.

EXAMPLE 2

In a second set of experiments, sodium chlorite solution (300 gpl NaClO$_2$) was used as the recipient medium at ambient temperature at varying recirculation rates. Each experiment ran 30 minutes. The results obtained are set forth in the following Table 2:

TABLE 2

| LINEAR SOLN. VELOCITY [cm/sec] | AVG. DONATING SOLN. ClO$_2$ CONC. [gpL] | FINAL ClO$_2$ IN CHLORITE SOLN. [gpL] | K-VALUE g/cm$^2$ min gpL × 10$^6$ |
|---|---|---|---|
| 4.7 | 3.52 | 0.12 | 37.2 |
| 5.9 | 2.97 | 0.18 | 68.1 |

As may be seen from these results, the K-values observed were about 50% lower than under analogous conditions for water as a recipient, indicating some transport inhibiting effects associated with the decreased solubility of chlorine dioxide in concentrated sodium chlorite solution. Nevertheless, the K-values were considered reasonable.

SUMMARY OF DISCLOSURE

In summary of this disclosure, the present invention provides a novel method of chlorine dioxide production involving membrane pervaporation of chlorine dioxide from aqueous chlorine dioxide-producing reactants to a recipient aqueous medium. Modifications are possible within the scope of this invention.

What we claim is:

1. A method for the formation of an aqueous solution of chlorine dioxide, which comprises:
providing a donor medium comprising chlorine dioxide in a first chamber of a transfer zone having a gaseous chlorine dioxide-permeable and aqueous medium-impermeable membrane separating said first chamber from a second chamber in said transfer zone, and
providing a recipient aqueous medium in said second chamber and passing gaseous chlorine dioxide through the membrane by pervaporation from said first chamber to said second chamber to be dissolved in said recipient aqueous medium while said membrane prevents the passage of aqueous medium between said first chamber and said second chamber.

2. The method of claim 1 wherein said donor medium in said first chamber comprises an aqueous reaction medium containing chlorine dioxide-generating components which produce chlorine dioxide for passage in gaseous form through said membrane.

3. The method of claim 1 wherein said donor medium in said first chamber comprises an aqueous solution of chlorine dioxide formed by the dissolution in water of gaseous chlorine dioxide produced from chlorine dioxide-generating reactants.

4. The method of claim 1 wherein said donor medium in said first chamber comprises an aqueous solution of chlorine dioxide formed by the dissolution in water of gaseous chlorine dioxide passed through a chlorine dioxide-permeable and aqueous medium-impermeable membrane from an aqueous reaction medium containing gaseous chlorine dioxide-generating reactants.

5. The method of claim 1 wherein said recipient aqueous medium in said second chamber is water and the aqueous medium removed from the second chamber is an aqueous solution of chlorine dioxide.

6. The method of claim 1 wherein said recipient aqueous medium in said second chamber is an aqueous slurry of wood pulp, whereby the wood pulp is bleached by said gaseous chlorine dioxide passing through said membrane and being dissolved in said aqueous medium.

7. The method of claim 1 wherein said recipient aqueous medium in said second chamber is an aqueous solution of sodium chlorite and the aqueous medium removed from the second chamber is an aqueous sodium chlorite solution having chlorine dioxide dissolved therein.

8. The method of claim 7 wherein said aqueous sodium chlorite solution having chlorine dioxide dissolved therein is electrolyzed to form sodium chlorite from the dissolved chlorine dioxide, sodium chlorite is recovered from the electrolyte and the resulting chlorine dioxide-depleted medium chlorite solution is recycled as said recipient aqueous medium.

9. The method of claim 1 wherein said donor medium in said first chamber comprises an aqueous solution of chlorine dioxide formed by the dissolution in water of gaseous chlorine dioxide produced from chlorine dioxide-generating reactants and said recipient aqueous medium in said second chamber is a chlorine dioxide-depleted spent catholyte from an electrolytic process for forming sodium chlorite.

10. The method of claim 1 wherein said donor medium in said first chamber comprises an aqueous solution of chlorine dioxide formed by the dissolution in water of gaseous chlorine dioxide passed through a chlorine dioxide-permeable and aqueous medium-impermeable membrane from an aqueous reaction medium containing chlorine dioxide-generating reactants and said recipient aqueous medium in said second chamber is a chlorine dioxide-depleted spent catholyte from an electrolytic process for forming sodium chlorite.

11. The method of claim 2 wherein said chlorine dioxide-generating reactants further produce chlorine and gaseous chlorine also passes through said membrane by pervaporation from said first chamber to said second chamber to be dissolved in said recipient aqueous medium in said second chamber.

12. The method of claim 1 wherein said donor medium further comprises chlorine and said recipient aqueous medium in said second chamber is acidified to inhibit passage of gaseous chlorine across said membrane from said first chamber to said second chamber and to inhibit dissolution of said gaseous chlorine in said recipient aqueous medium in said second chamber.

13. The method of claim 1 wherein said membrane comprises a sheet of expanded polytetrafluoroethylene.

14. The method of claim 1 wherein said membrane has a pore size of about 0.02 to about 15 microns and a porosity of about 50 to about 98%.

15. The method of claim 1 wherein said donor medium in said first chamber comprises an aqueous solution of chlorine dioxide formed by the dissolution in water of gaseous chlorine dioxide passed through a chlorine dioxide-permeable and aqueous medium-impermeable membrane from a second donor medium comprising chlorine dioxide.

* * * * *